United States Patent

[11] 3,530,781

[72] Inventor Charles W. Kesinger
 Tacoma, Washington
[21] Appl. No. 720,731
[22] Filed April 11, 1968
[45] Patented Sept. 29, 1970
[73] Assignee Lundberg Concrete Pipe Co., Inc.,
 Tacoma, Washington
 a corporation of Washington

[54] TRANSFORMER HOUSING AND VENTED COVER ASSEMBLY
 2 Claims, 5 Drawing Figs.
[52] U.S. Cl. ....................................... 98/101,
 52/20, 98/121
[51] Int. Cl. ....................................... F24f 13/08
[50] Field of Search............................. 98/101,
 103, 104, 108, 121, 49, 52, 114; 52/20

[56] References Cited

UNITED STATES PATENTS

| | | | |
|---|---|---|---|
| 3,479,777 | 11/1969 | Schack ........................ | 52/20 |
| 1,390,347 | 9/1921 | Elliston ....................... | 98/114 |
| 2,211,568 | 8/1940 | Henney ....................... | 98/121 |
| 3,236,171 | 2/1966 | Vaskov ....................... | 98/114 |

Primary Examiner—Meyer Perlin
Attorney—Christensen, Sanborn and Matthews

ABSTRACT: This application discloses an improved cover for a transformer housing of the type adapted to protect a transformer when located in an underground installation. The improved cover for the housing includes a plurality of angled air directing bars so interconnected and rigidly positioned with respect to each other that elongated objects such as sticks or poles cannot be inserted through the cover. At the same time the arrangement of the members is such that air currents over the cover set up air currents within the housing chamber with a preferential direction of air flow resulting in increased air circulation as compared to prior art covers. Details of an improved fastening assembly for securing the metal portion of the cover to a concrete portion of the cover are also disclosed.

Patented Sept. 29, 1970
3,530,781
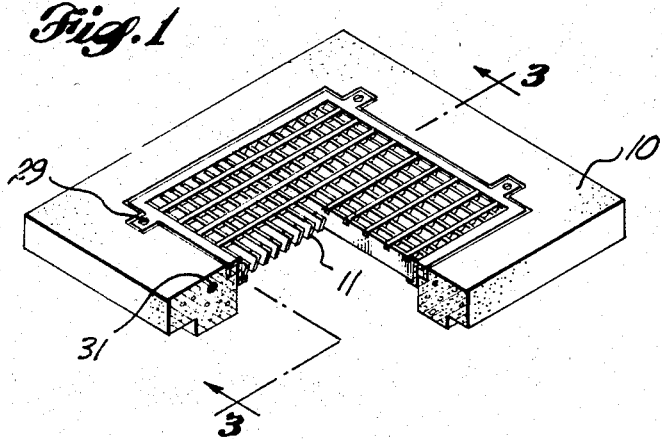
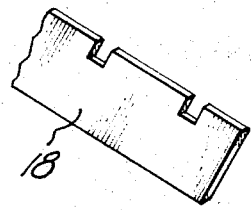
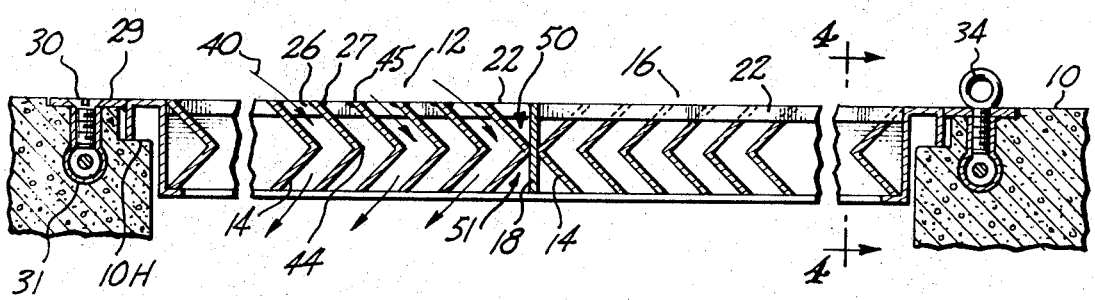
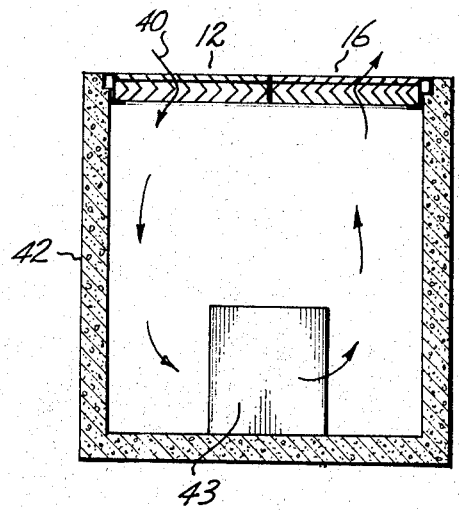
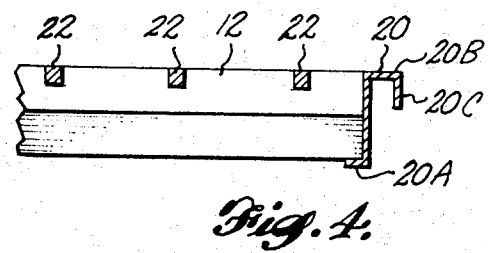
INVENTOR.
CHARLES W. KESINGER
BY
Christensen, Sanborn, & Matthews
ATTORNEYS

TRANSFORMER HOUSING AND VENTED COVER ASSEMBLY

At the present time there is an increasing trend toward underground wiring installations which necessitates the placing of electrical transformers in protective housings located beneath the surface of the earth. Much effort has been directed toward the development of concrete transformer cells which have been found to work well for protecting the transformers in their underground locations. It is recognized that the heat generated by the transformer gives rise to a need for adequate ventilation of the transformer while simultaneously the physical location of the transformer necessitates protective measures to prevent the insertion of elongated objects such as poles or sticks through ventilating covers typically utilized for permitting the flow of air around the transformer. According to one established technique a metal grate having a plurality of steel bars running parallel to the surface of the earth are arranged in the cover of the transformer housing so that air can flow between adjacent bars. However if the bars are the only protective members above the transformer a danger exists in that a person can damage the transformer as well as run the risk of electrical shock by inserting members through the grate and into contact with the transformer and associated wiring. In an effort to prevent such damage to the transformer and/or to the person who might insert such an object through the grating the art has turned toward the use of protective plate members located beneath the steel grate. While such an arrangement serves to protect the transformer and the individual holding an object intended to be placed in contact with the transformer, it is found that the manufacturing cost for the transformer housing is substantially increased and also the circulation of cooling air is impaired.

It is therefore an object of the present invention to provide an improved transformer housing and particularly an improved cover assembly for a transformer housing.

Another object of the present invention is to provide an improved cover for a transformer cell with said cover having the ability to direct air currents in a preferential manner downwardly through one portion of the housing and upwardly through another portion of the housing to thereby obtain the benefit of increased air circulation around the transformer.

An additional object of the present invention is to provide a simplified transformer cell cover having the ability to increase air flow around a transformer while simultaneously protecting the transformer against the insertion of elongated objects through the cover and into contact with the transformer.

A further object of the present invention is to provide an improved transformer cell cover having an improved fastening arrangement between the metal and concrete portions of the cover to thereby facilitate removal of the cover from the transformer cell.

Another object of the invention is to provide an assembly such as described above wherein the fabrication cost is materially below that of competing assemblies with the improved assembly having better air flow and protection capabilities.

The above as well as additional objects of the invention are achieved through the use of a cover assembly having a first plurality of angle-iron (or steel) vent strips extending in a predetermined spacing across a first portion of the transformer housing cover. A second set of similar angle-iron strips or vent bars are located in the cover assembly but with their angles being opposite to the angle of the first set. The arrangement is such that air currents in a first direction over the surface of the cover tend to become trapped by the one set of angle members and as a result directed in a generally downward direction toward the transformer for cooling purposes. Due to the angle of the second set with respect to the first step the resulting circulating air currents tend to flow upwardly and out from the transformer housing through the second set without the impairment of the substantial downdrafts directed through the first set. The net effect is increased air circulation.

The spacing of the angle members is such that the apex of each angle member extends beneath the upper edge of an adjacent angle member. Therefore, there is no straight-line path from the exterior of the housing to the interior of the housing and hence an elongated object such as a stick, a pole, or a metal bar cannot be inserted through the cover and into engagement with the transformer.

The improved cover includes the usual concrete portion which is sufficiently heavy and strong to support substantial loads being applied to the cover. Due to the weight of the cover of the present invention as well as to covers heretofore used in the art it is necessary to make provision for securing a lifting member such as a cable and hook assembly to the cover for lifting by a crane, derrick, or similar equipment. It is typical in the prior art to provide bolt-receiving holes in the concrete portion of the cover for the receipt of eyed lifting bolts at the time of a lifting operation. During normal usage however the lifting bolts must be removed to avoid the problem of vertical protrusions which would impair the appearance of the cover as well as present a hindrance to foot or vehicle traffic thereover. In the prior art it has been found that the bolt holes typically become clogged by dirt and other debris giving rise to the need for plug bolts.

In the present cover assembly the metal portion of the cover is secured to the concrete portion by means of bolts which thread into ferrel-loop inserts cast in the walls of the concrete top with reinforcing steel bars passing through the eyes of the loops. Due to this arrangement the bolts for lifting the cover from the housing proper can be inserted in the same holes as used for holding the metal portion of the cover in place on the concrete portion. As a result the bolts normally required for holding the metal portion in position on the concrete portion serve to prevent any clogging or filling of the lifting bolt receiving holes. That is, the bolt receiving holes serve the dual function of receiving the metal frame portion holding bolts as well as the lifting bolts.

The above and other advantages and objects of the invention will be more clearly understood from the following description when read with reference to the accompanying drawings wherein;

FIG. 1. is a perspective view partially cut away showing a preferred embodiment of the transformer cell cover;

FIG. 2 is an enlarged perspective view of the center support brace in the assembly of FIG. 1;

FIG. 3 is an enlarged sectional view along the lines 3–3 of FIG. 1;

FIG. 4 is a sectional view along the lines 4–4 of FIG. 3; and

FIG. 5 is a cross-sectional view on a reduced scale showing a complete transformer cell having the improved cover of the present invention installed thereon and illustrating the manner in which increased air flow is achieved.

Turning now to the drawings and in particular to FIG. 1 the improved transformer cell cover will be seen to include a concrete section 10 which is provided with an opening in the center thereof so that the metal section 11 of the cover assembly can be located therewithin. As seen most clearly in FIG. 3 the center metal vent assembly 11 includes a first set of angled grate members which can be termed vent bars 12 each of which has first and second sections 13 and 14 which form an angle of approximately 90°.

A second set of vent bar members 16 each similarly includes the sections 13 and 14 but with the angle of the second set being reversed with respect to that of the first set. The first and second sets are separated by the central reinforcing bar 18 which lies in a vertical plane and is seen more clearly in the enlarged detailed view of FIG. 2. As seen most clearly in FIGS. 1 and 4 the vent bars 12 and 16 are located within a metal channel frame 20 having a lower horizontal lip 20A on which the ends of the vent bars rest. In practice the ends of the vent bars are advantageously welded to the channel frame 20. The channel frame 20 also includes a second horizontal section 20B having an integral downwardly turned lip 20C which then rests on the ledge 10A of the concrete section 10 (FIG. 3).

In order to provide increased strength for the assembly and to prevent bending of the vent bars, a plurality of reinforcing bars 22 extend across the upper edges of the vent bars 12 and 16. As seen most clearly in FIG. 4 the reinforcing bars 22 are actually recessed in the openings provided in the upper edge of each vent bar 12 and 16. As seen in FIG. 3 each vent bar is welded at points 26 and 27 to each of the reinforcing bars 22 and thus an extremely strong and stable structure is provided.

As seen in FIGS. 1 and 3 the channel frame 20 is provided with four horizontal attachment tabs 29 each of which has a hole provided therein for the passage of a retaining bolt 30. The retaining bolts engage with the female threads of the ferrel-loop inserts 31 which are disposed within the concrete 10. A reinforcing bar 33 extends through the loop-ends of the inserts so that it is virtually impossible to pull the insert from the concrete of the cover. Thus the arrangement permits use of the retaining bolts 30 during normal conditions when the cover is in place on the transformer cell. However, when the cover is to be removed the bolts 30 can be removed and in their place heavy lifting bolts 34 (FIG. 3) can be inserted to permit mechanized removal of the cover. Thus the problems normally associated with open bolt receiving holes or the use of plug bolts are completely eliminated and removal of the cover is facilitated.

As illustrated by the arrows 40 in FIGS. 3 and 5 the movement of air across the surface of the cover in the direction from left to right in FIG. 3 results in a portion of the air being trapped by the vent members 12 and directed in a generally downward direction into the chamber provided by the transformer cell 42 (FIG. 5). With the lower portion 14 of each vent bar 12 being directed away from a vertical direction, it will be seen that the air is directed toward the left side of the cell as well as downwardly. Thus the air is directed toward the transformer indicated diagrammatically at 43 in FIG. 5. After passing around the transformer the cooling air then sweeps upwardly toward the second set of vent bars 16 for discharge from the housing. It is found that due to the reversed angles of the two sets of vent bars and the normal convection currents associated with heating of the air by the transformer, a large volume of air circulates through the transformer cell 42 and around the transformer 43. Thus the desired cooling of the transformer is achieved.

It will be seen in FIG. 3 that the apex 44 of each angled vent member is so positioned with respect to the upper edge 45 of an adjacent vent member that there is no straight-line path from the exterior of the cover to the interior of the transformer cell. Thus the cover serves to prevent the insertion of a foreign object in the nature of a straight stick, metal pipe, etc. Thus the transformer is protected and also careless or unknowledgeable persons such as children are simultaneously protected from the electrical hazard associated with the insertion of such objects into the transformer cell.

It will be seen that the upper section 13 of each vent bar forms a first acute angle 50 with respect to an upwardly extending perpendicular line and that the lower portion 14 forms an acute angle 51 relative to a line extending perpendicular from the cover downwardly. In the presently preferred embodiment the angle of the vent members is approximately 90°. However it will be seen that the angle is not critical while the increased air flow capabilities can be achieved without the overlapping of the vent members, it is seen that an added protection advantage is obtained when the apex of one vent member underlies the upper edge of an adjacent vent member. In practice it is also found that the cover assembly can be fabricated at a cost which is lower than that required for fabricating the covers presently in use. The vent members 12 and 16 are conveniently made from flat stock material with the rectangular notches in one edge of each vent member for receipt of the reinforcing bars 22 being stamped or pressed from each vent member. The flat stock is then crimped into the desired angular condition. The angled vent members are then aligned within and welded to the steel channel frame 20 with the reinforcing bars 22 being inserted in the rectangular notches provided in the tops of the vent members.

While the invention has been disclosed by reference to a presently preferred embodiment and assembly techniques, it will be evident to those skilled in the art that modifications in the invention can be accomplished without departing from the spirit of the invention.

I claim:

1. A vent assembly for the cover of a transformer housing comprising in combination: first and second sets of elongated vent bars each having an upper edge and first and second planar surfaces which are non-coplanar and are joined to form an angle of intersection of approximately 90°, the apex of each such juncture of the surface of said first set being diametrically opposed to the angles formed by the junctures of the surfaces of said second set; and support means holding each of said bars against movement within the cover with the first section of each bar located above the second section thereof and with the upper edge of each bar in said first set located above a portion of an adjacent bar in said first set when progressing from a first bar in said first set in a first direction, the upper edge of each bar in said second set being located above a portion of an adjacent bar in said second set when progressing from one of said bars in said second set in a direction opposite to said first direction, said support means including a plurality of support bars extending across said vent bars in a direction substantially perpendicular to the longitudinal extent of said vent bars, each of said vent bars having a plurality of support bar receiving openings therein with said support bars being recessed therein and secured to each of said vent bars.

2. A cover for a transformer housing comprising in combination: a concrete support frame adapted to fit the top opening of the housing and having an air vent opening therein; first and second sets of vent bars extending across said opening and held in parallel relationship therewithin, each of said bars being spaced from an adjacent bar and having an angled cross section such that the space between adjacent bars in said first set define a first plurality of curved air paths for preferentially directing air in one direction into the housing and the adjacent bars in said second set define a second plurality of curved air paths for preferentially directing air in another direction into the housing, said one direction being downward and toward one side of the housing and said other direction being downward and toward a diametrically opposed side of the housing and the upper edge of each vent bar overlies a portion of an adjacent vent bar; a channel member extending around the inside of said opening and having said vent bars connected thereto for support, said channel member having a plurality of substantially horizontal tabs extending across a portion of the concrete frame; a plurality of threaded ferrel-loop inserts disposed in the concrete frame beneath said tabs; a reinforcing bar extending through the loop of each insert for firmly anchoring said inserts in the concrete; and bolt means extending through said tabs and into said inserts for holding said channel member and associated vent bars in position on said concrete frame, whereby said bolt means can be removed and the ferrel inserts used as anchor points for the receipt of cover lifting members.